(12) United States Patent
Tian et al.

(10) Patent No.: US 12,160,870 B2
(45) Date of Patent: Dec. 3, 2024

(54) METHOD FOR DETERMINING UNAVAILABLE RESOURCE, TERMINAL DEVICE AND NETWORK DEVICE

(71) Applicant: GUANGDONG OPPO MOBILE TELECOMMUNICATIONS CORP., LTD., Dongguan (CN)

(72) Inventors: Wenqiang Tian, Dongguan (CN); Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 331 days.

(21) Appl. No.: 17/703,642

(22) Filed: Mar. 24, 2022

(65) Prior Publication Data
US 2022/0217689 A1 Jul. 7, 2022

Related U.S. Application Data

(63) Continuation of application No. PCT/CN2019/109629, filed on Sep. 30, 2019.

(51) Int. Cl.
*H04W 72/23* (2023.01)
*H04W 48/10* (2009.01)

(52) U.S. Cl.
CPC ............ *H04W 72/23* (2023.01); *H04W 48/10* (2013.01)

(58) Field of Classification Search
CPC ..... H04W 48/12; H04W 48/10; H04W 72/23; H04W 56/00; H04L 5/0048
See application file for complete search history.

(56) References Cited

U.S. PATENT DOCUMENTS

2019/0159180 A1  5/2019  Ly et al.
2019/0159226 A1*  5/2019  Ly ..................... H04L 5/0053
(Continued)

FOREIGN PATENT DOCUMENTS

CN   110035506 A   7/2019

OTHER PUBLICATIONS

International Search Report and Written Opinion date Jun. 22, 2020 in International Application No. PCT/CN2019/109629. English translation attached.
(Continued)

*Primary Examiner* — Chi Ho A Lee
(74) *Attorney, Agent, or Firm* — Sheppard, Mullin, Richter & Hampton LLP

(57) ABSTRACT

Provided are a method for determining an unavailable resource, a terminal device, and a network device. The method includes: determining, by a terminal device, a first resource corresponding to a first-type Synchronization Signal Block (SSB); and determining, by the terminal device, an unavailable resource for Remaining System Information (RMSI) based on the first resource and a second resource corresponding to the RMSI. The first-type SSB is an SSB transmitted on a non-Synchronization Signal (SS) raster. Based on the first resource corresponding to the first-type SSB and the second resource corresponding to the RMSI, the unavailable resource for the RMSI can be determined. This not only ensures that the RMSI resource mapping can be performed correctly, but also makes system scheduling more flexible. For example, a network device does not have to intentionally avoid collisions between the SSB and a PDCCH and a PDSCH of the RMSI in limited time-frequency resources.

16 Claims, 5 Drawing Sheets

(56) References Cited

U.S. PATENT DOCUMENTS

| | | |
|---|---|---|
| 2019/0327767 A1* | 10/2019 | Islam .................. H04W 72/046 |
| 2020/0213968 A1* | 7/2020 | Akkarakaran ...... H04W 56/001 |
| 2020/0252891 A1* | 8/2020 | Chendamarai Kannan ................ H04W 74/0808 |
| 2020/0413356 A1* | 12/2020 | Wang ................ H04W 56/0015 |
| 2021/0022186 A1* | 1/2021 | Liu .................. H04W 72/0446 |
| 2021/0084687 A1* | 3/2021 | Liu .................. H04W 74/0833 |
| 2021/0153174 A1* | 5/2021 | Liu ....................... H04W 72/23 |
| 2021/0307036 A1* | 9/2021 | Myung ............. H04W 72/1268 |
| 2022/0191810 A1* | 6/2022 | Tang ..................... H04L 5/0092 |
| 2022/0272664 A1* | 8/2022 | Takeda .............. H04W 56/0015 |

OTHER PUBLICATIONS

Vivo. "Remaining configuration issues for BFR", 3GPP TSG-RAN WG2 Meeting #Ad hoc 1802 R2-1809872, Jul. 6, 2018 (Jul. 6, 2018), full text, 3 pages.

CATT. "On Remaining Issues on RMSI", 3GPP TSG RAN WG1 Meeting AH 1801 R1-1800229, Jan. 26, 2018 (Jan. 26, 2018), full text, 37 pages.

3GPP 38.213. 3rd Generation Partnership Project, Technical Specification Group Radio Access Network, NR, Physical layer procedures for control (Release 16), Sep. 2021, 192 pages.

3GPP 38.214. 3rd Generation Partnership Project, Technical Specification Group Radio Access Network;NR;Physical layer procedures for data (Release 16), Sep. 2021, 176 pages.

\* cited by examiner

METHOD FOR DETERMINING UNAVAILABLE RESOURCE, TERMINAL DEVICE AND NETWORK DEVICE

CROSS-REFERENCE TO RELATED APPLICATIONS

The present application is a continuation of International Application No. PCT/CN2019/109629 filed on Sep. 30, 2019, which is hereby incorporated by reference in its entirety.

TECHNICAL FIELD

The embodiments of the present disclosure relates to communication technology, and more particularly, to a method for determining an unavailable resource, a terminal device and a network device.

BACKGROUND

In the 5G New Radio (NR) system, resources corresponding to Remaining System Information (RMSI) include a resource for transmitting control information of the RMSI and a resource for transmitting data information of the RMSI. The resource for transmitting the control information of the RMSI is a resource in a Control Resource Set (CORESET), and the resource for transmitting the data information of the RMSI is a resource allocated by a network device.

For example, in an initial access process, a terminal device does not expect (or expects by default) a resource overlap between a Synchronization Signal Block (SSB) and RMSI.

However, in the NR-U system, there may be a collision between a resource corresponding to an SSB and a resource corresponding to RMSI.

Therefore, there is a need for a method for determining an unavailable time-frequency resource due to impact of an SSB, which can be applied to determine an unavailable time-frequency resource position when a transmission resource for control information and data information of RMSI and a transmission resource for an SSB collide.

SUMMARY

A method for determining an unavailable resource, a terminal device, and a network device are provided, capable of determining an unavailable resource for RMSI, thereby improving data transmission efficiency and reducing power consumption.

In a first aspect, a method for determining an unavailable resource is provided. The method includes: determining, by a terminal device, a first resource corresponding to a first-type Synchronization Signal Block (SSB); and determining, by the terminal device, an unavailable resource for Remaining System Information (RMSI) based on the first resource and a second resource corresponding to the RMSI. The first-type SSB is an SSB transmitted on a non-Synchronization Signal (SS) raster.

In a second aspect, a method for determining an unavailable resource is provided. The method includes: determining, by a network device, a first resource corresponding to a first-type Synchronization Signal Block (SSB); and determining, by the network device, an unavailable resource for Remaining System Information (RMSI) based on the first resource and a second resource corresponding to the RMSI. The first-type SSB is an SSB transmitted on a non-Synchronization Signal (SS) raster.

In a third aspect, a terminal device is provided. The terminal device is configured to perform the method according to the above first aspect or any implementation thereof. In particular, the terminal device includes one or more functional modules for performing the method according to the above first aspect or any implementation thereof.

In a fourth aspect, a network device is provided. The network device is configured to perform the method according to the above second aspect or any implementation thereof. In particular, the network device includes one or more functional modules for performing the method according to the above second aspect or any implementation thereof.

In a fifth aspect, a terminal device is provided. The terminal device includes a processor and a memory. The memory is configured to store a computer program, and the processor is configured to invoke and execute the computer program stored in the memory to perform the method according to the above first aspect or any implementation thereof.

In a sixth aspect, a network device is provided. The network device includes a processor and a memory. The memory is configured to store a computer program, and the processor is configured to invoke and execute the computer program stored in the memory to perform the method according to the above second aspect or any implementation thereof.

In a seventh aspect, a chip is provided. The chip is configured to perform the method according to any of the above first and second aspects or any implementation thereof. In particular, the apparatus includes a processor configured to invoke and execute a computer program from a memory, to enable a device provided with the chip to perform the method according to any of the above first and second aspects or any implementation thereof.

In an eighth aspect, a computer-readable storage medium is provided. The computer-readable storage medium is configured to store a computer program that enables a computer to perform the method according to any of the above first and second aspects or any implementation thereof.

In a ninth aspect, a computer program product is provided. The computer program product includes computer program instructions that cause a computer to perform the method according to any of the above first and second aspects or any implementation thereof.

In a tenth aspect, a computer program is provided. The computer program, when executed on a computer, causes the computer to perform the method according to any of the above first and second aspects or any implementation thereof.

With the above technical solutions, the unavailable resource for the RMSI can be determined based on the first resource corresponding to the first-type SSB and the second resource corresponding to the RMSI. This not only ensures that the RMSI resource mapping can be performed correctly, but also makes system scheduling more flexible. For example, a network device does not have to intentionally avoid collisions between the SSB and a PDCCH and a PDSCH of the RMSI in limited time-frequency resources.

For example, for a secondary cell in NR-U where a first-type SSB and control information and data information of cell RMSI are desired to be transmitted at the same time given limited time-frequency domain resources, by determining the unavailable resource for the RMSI based on the resource for the first-type SSB, it can not only ensure that the RMSI resource mapping can be performed correctly, but also make system scheduling more flexible. For example, a network device does not have to intentionally avoid collisions between the SSB and a PDCCH and a PDSCH of the RMSI in the limited time-frequency resources.

DESCRIPTION OF EMBODIMENTS

The technical solutions in the embodiments of the present disclosure will be described below with reference to the figures in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

Figure 1:
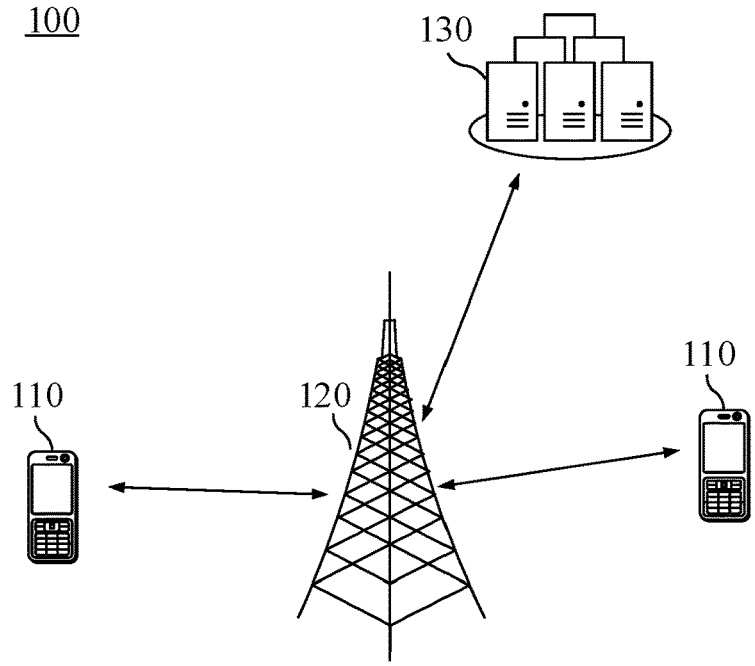
FIG. 1 is a schematic diagram showing an example of a scenario in which the present disclosure can be applied.

FIG. 1 is a schematic diagram showing a scenario in which an embodiment of the present disclosure can be applied.

As shown in FIG. 1, a communication system 100 may include terminal devices 110 and a network device 120. The network device 120 may communicate with the terminal devices 110 via an air interface. Multi-service transmissions are supported between the terminal devices 110 and the network device 120.

It can be appreciated that the embodiments of the present disclosure are described with reference to the communication system 100 for illustration only, but the embodiments of the present disclosure are not limited thereto. That is, the technical solutions according to the embodiments of the present disclosure can be applied to various communication systems, including for example: a Long Term Evolution (LTE) system, an LTE Time Division Duplex (TDD) system, a Universal Mobile Telecommunication System (UMTS), the 5$^{th}$ Generation (5G, also referred to as NR) communication system, or any future communication system.

In the communication system 100 as shown in FIG. 1, the network device 120 may be an access network device that can communicate with the terminal devices 110. The access network device may provide communication coverage for a particular geographic area, and may communicate with the terminal devices 110 (e.g., UEs) located in the coverage area.

The network device 120 may be an evolutional base station (such as an evolutional Node (eNB or eNodeB)) in an LTE system, a Next Generation Radio Access Network (NG RAN) device, a base station such as a gNB in an NR system, or a radio controller in a Cloud Radio Access Network (CRAN). Alternatively, the network device 120 may be a relay station, an access point, a vehicle-mounted device, a wearable device, a hub, a switch, a network bridge, a router, or a network device in a future evolved Public Land Mobile Network (PLMN).

Each of the terminal devices 110 may be any terminal device, including but not limited to a terminal device connected to the network device 120 or other terminal devices in a wired or wireless manner.

For example, the terminal device 110 may be an access terminal, a User Equipment (UE), a user unit, a user station, a mobile station, a mobile stage, a remote station, a remote terminal, a mobile device, a user terminal, a terminal, a wireless communication device, a user agent, or a user device. Alternatively, the access terminal can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in a 5G network, or a terminal devices in a future evolved network, etc.

Device to Device (D2D) communication may be performed between the terminal devices 110.

The wireless communication system 100 may also include a core network device 130 that communicates with a base station. The core network device 130 may be a 5G Core (5GC) device, for example, Access and Mobility Management Function (AMF), Authentication Server Function (AUSF), User Plane Function (UPF), or Session Management Function (SMF). Optionally, the core network device 130 may also be an Evolved Packet Core (EPC) device in an LTE network, e.g., a Session Management Function+Core Packet Gateway (SMF+PGW-C) device. It is to be noted that the SMF+PGW-C can provide the functions of both SMF and PGW-C. In the process of network evolution, the above core network devices may have different names, or new network entities may be formed by dividing the functions of the core network. The embodiment of the present is not limited to this.

Connections may be established between various functional units in the communication system 100 via Next Generation (NG) interfaces for communication.

For example, the terminal device can establish an air interface connection with the access network device via an NR interface to transmit user plane data and control plane signaling. The terminal device can establish a control plane signaling connection with the AMF via an NG interface 1 (N1). The access network device, such as a next generation radio access base station (such as gNB), can establish a user plane data connection with the UPF via an NG interface 3 (N3). The access network device can establish a control plane signaling connection with the AMF via an NG interface 2 (N2). The UPF can establish a control plane signaling connection with the SMF via an NG interface 4 (N4). The UPF can exchange user plane data with a data network via an NG interface 6 (N6). The AMF can establish a control plane signaling connection with the SMF via an NG interface 11 (N11). The SMF can establish a control plane signaling connection with the PCF via an NG interface 7 (N7).

FIG. 1 exemplarily shows one base station, one core network device, and two terminal devices. Optionally, the wireless communication system 100 may include a plurality of base station devices and the coverage of each base station may include a different number of terminal devices. The embodiment of the present disclosure is not limited to this.

It can be appreciated that, in the embodiment of the present disclosure, a device with a communication function in a network/system may be referred to as a communication device. For the communication system 100 shown in FIG. 1 as an example, communication devices may include the network device 120 and the terminal devices 110, each having a communication function. The network device 120 and the terminal devices 110 may be e.g., any of the devices described above, and details thereof will be omitted here. The communication device may also include other devices in the communication system 100, such as a network controller, a mobility management entity, and other network entities, and the embodiment of the present disclosure is not limited to this.

It is to be noted that the terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

In the communication system 100, the network device 120 can transmit two types of SSBs to the terminal device 110, including e.g., a first-type SSB, also be referred to as non-CD SSB, and a second type SSB, also be referred to as CD SSB.

The first-type SSB may include those SSBs that are not CD SSBs.

A CD SSB is an SSB used to define a cell. One of its characteristics is that the CD SSB is transmitted on an SS raster, and the CD SSB is typically associated with RMSI. That is, when a UE detects a CD SSB, it can detect the RMSI corresponding to the SSB accordingly, and in turn obtain cell information. In 5G, in addition to the CD SSB, with factors such as measurement taken into account, some additional SSBs may be transmitted. These SSBs may not be transmitted on the frequency points of the SS raster. In the embodiment of the present disclosure, such SSB is defined as the first-type SSB.

The first-type SSB can be used as a measurement reference signal, which can carry PCI information and information in an MIB.

In some embodiments of the present disclosure, the communication system 100 may be applicable to a 5G NR communication network.

In the 5G NR system, resources corresponding to RMSI include a resource for transmitting control information of the RMSI and a resource for transmitting data information of the RMSI. The resource for transmitting the control information of the RMSI is a resource in a Control Resource Set (CORESET), and the resource for transmitting the data information of the RMSI is a resource allocated by a network device.

For example, in an initial access process, a terminal device does not expect (or expects by default) a resource overlap between an SSB and RMSI.

In other words, before the terminal device reads the information carried in the RMSI, there is no need to determine the resource for the RMSI based on the resource for the SSB.

In the RMSI, the network device can notify the terminal device of the SSB transmission condition in the current cell in a form of a bitmap, which can be used by the terminal device to determine the transmission positions of the SSB. These positions will be used as unavailable resources in a resource mapping for subsequent transmission of control information and data information.

In addition, the UE will also be notified of the period information for the above SSB in the RMSI, such that the UE can fully know the actual transmission condition of the SSB. It is to be noted that the SSBs indicated by the RMSI as described here are all CD SSBs, which means that these SSBs are all SSBs on the SS raster frequency points, and these SSBs have respective associated RMSI transmissions.

In some other embodiments of the present disclosure, the communication system 100 may also be used in an NR-U network.

The NR-U can operate in an unlicensed frequency band.

Since the unlicensed frequency band is a shared frequency band, different operators or companies may share the same frequency band or frequency point. In this case, users of the networks will use limited channel resources in a contention-based manner. A new problem in this case is that if two operators, Operator A and Operator B, both deploy cells with the same cell ID on the same frequency, such as, Cell ID25 (Operator A) and Cell ID25 (Operator B), and if these two cells are both used as secondary cells, the following potential scenarios may occur:

(1) For a secondary cell, the synchronization signal or SSB of the cell may be deployed and transmitted on the frequency point of non-synchronization raster.

(2) The terminal device needs to determine network information, such as PLMN and CGI, or global cell ID information based on SIB1 (RMSI), so as to distinguish different operator information, and in turn avoid problems such as cell confusion and potential incorrect scheduling caused by different operators deploying cells with the same cell ID at the same frequency point. In other words, in this case Cell A and Cell B need to transmit the RMSI (i.e., SIB1).

In other words, in a deployment scenario represented by an unlicensed frequency band, there is a need to transmit the first-type SSB and the cell RMSI at the same time.

In the design of the 5G NR system, the resource mapping problem caused by SSB transmission is taken into account, as described above, for dealing with the above resource collision that may be caused by the SSB transmission. However, it needs to be pointed out that two important issues still exist.

First, the design of the 5G NR system has a strong premise that requires the terminal device to assume that, when receiving the control information and the data information of the RMSI, there will be no collision between the resource position where the above information is located and the SSB resource. This constraint is guaranteed by the implementation of the 5G NR system. However, in the NR-U system, it is difficult to guarantee the applicability of the above assumption when the need to transmit the first-type SSB and the cell RMSI at the same time is taken into account.

The reason is that an initial access bandwidth in the unlicensed frequency band will not exceed the predefined size of 20M, which limits the possibility that the control information and the data information of the RMSI and the first-type SSB can be separated in the frequency domain. In the time domain, due to the limitation of the LBT mechanism and the COT size, if it is necessary to transmit the SSB and the RMSI within a COT, accordingly the possibility that the control information and the data information of the RMSI and the first-type SSB can be separated in the time domain is limited. In summary, when the need to transmit the first-type SSB and the cell RMSI at the same time is taken into account, it is difficult to effectively apply the simple scheme in the existing system that the UE can assume that there will be no resource collision between the SSB and the RMSI.

Therefore, in the NR-U system, it is likely that the resource corresponding to the SSB may collide with the resource for the RMSI.

Figure 2:
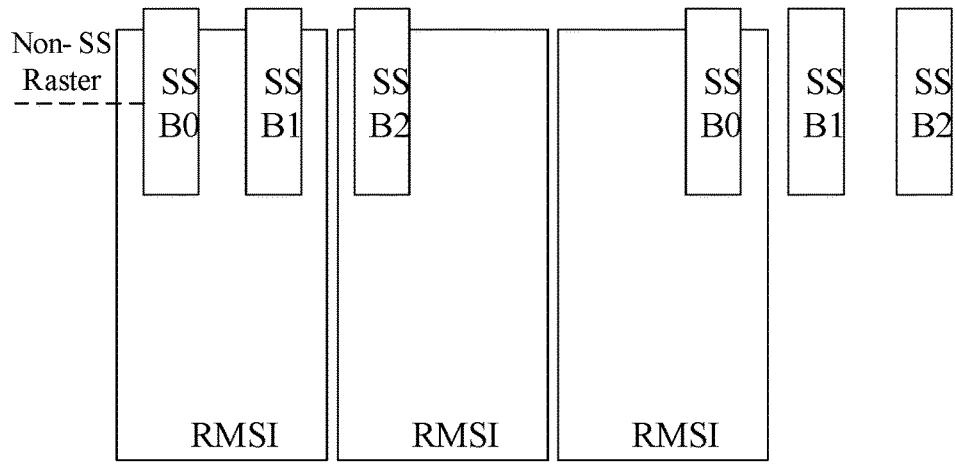
FIG. 2 is a schematic block diagram showing overlap between a resource corresponding to a first-type SSB and a resource corresponding to RMSI in an embodiment of the present disclosure.

Taking FIG. 2 as an example, the resource for the first RMSI overlaps the resource for SSB0 and SSB1, the resource for the second RMSI overlaps the resource for SSB2, and the resource for the third RMSI overlaps the resource for SSB0. Here, the resource for the RMSI may be the resource for the control information of the RMSI, or the resource for the data information of the RMSI.

In addition, in the NR system, even the SSB transmission information indicated in the RMSI only takes into account the time-frequency resource positions that cannot be used in the resource mapping for the control information and the data information due to the impact of the CD SSB. However, the above indication information is not applicable to the problem to be solved by the present disclosure, which is related to determining of the unavailable time-frequency resource due to the impact of the first-type SSB.

In summary, taking the NR-U system as an example, there is a need to transmit the first-type SSB and the cell RMSI at the same time, and it does not consider any form of collision between the transmission resource for the SSB and the transmission resource for the control information and the data information of the RMSI, or the problem of determining the unavailable time-frequency resource information based on the first-type SSB. In view of this, it is desired to provide a method for determining an unavailable time-frequency resource due to the impact of the first-type SSB. Further, this method can be applied to determine the unavailable time-frequency resource position when the transmission resource for the first-type SSB collides with the transmission resource for the control information and the data information of the RMSI.

Figure 3:
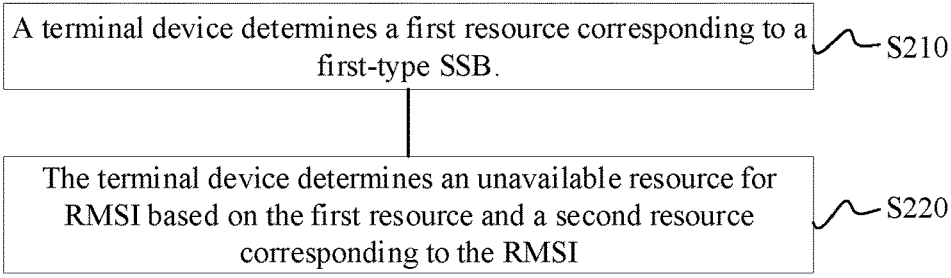
FIG. 3 is a schematic flowchart illustrating a method in a terminal device for determining an unavailable resource according to an embodiment of the present disclosure.

FIG. 3 shows a schematic flowchart of a method 200 for determining an unavailable resource according to an embodiment of the present disclosure. The method 200 may be executed by a terminal device. It can be appreciated that the method 200 may be applicable to an NR-U communication network. It can also be appreciated that the terminal device shown in FIG. 3 may be the terminal device shown in FIG. 1. The method 200 shown in FIG. 3 may alternatively be executed by a network device. For the purpose of description, the terminal device is taken as an example below.

As shown in FIG. 3, the method 200 includes some or all of the following content.

At S210, a terminal device determines a first resource corresponding to a first-type Synchronization Signal Block (SSB).

At S220, the terminal device determines an unavailable resource for Remaining System Information (RMSI) based on the first resource and a second resource corresponding to the RMSI.

Here, the first-type SSB is an SSB transmitted on a non-Synchronization Signal (SS) raster.

For example, the first-type SSB may be a first-type SSB, i.e., the first-type SSB may include an SSB carrying a Physical Cell Identity (PCI) and a System Information Block (MIB). The terminal device knows which resources cannot be used for resource mapping when determining a control resource and a data resource for the RMSI, and a corresponding network device cannot use these unavailable resources for resource mapping or cannot use specific resources affected by these resources. Here, the unavailable resource may be a resource unavailable for RMSI transmission due to the impact of the first-type SSB. That is, the terminal device needs to determine the transmission condition of the first-type SSB, including a transmission period, a position within the period, and an actual transmission condition within the period, before receiving and parsing the control information and the data information of the RMSI, and then determine the unavailable resource based on the transmission condition of the first-type SSB.

In other words, after determining the first resource, the terminal device can determine the unavailable resource for the RMSI based on the first resource and the second resource.

The unavailable resource for the RMSI can be determined based on the first resource corresponding to the first-type SSB and the second resource corresponding to the RMSI. This not only ensures that the RMSI resource mapping can be performed correctly, but also makes system scheduling more flexible. For example, a network device does not have to intentionally avoid collisions between the SSB and a PDCCH and a PDSCH of the RMSI in limited time-frequency resources.

For example, for a secondary cell in NR-U where a first-type SSB and control information and data information of a cell RMSI are desired to be transmitted at the same time given limited time-frequency domain resources, by determining the unavailable resource for the RMSI based on the resource for the first-type SSB, it can not only ensure that the RMSI resource mapping can be performed correctly, but also make system scheduling more flexible. For example, a network device does not have to intentionally avoid collisions between the SSB and a PDCCH and a PDSCH of the RMSI in the limited time-frequency resources.

In some embodiments of the present disclosure, the second resource may be a resource in a control resource set that is to be used for transmitting control information of the RMSI, and the unavailable resource may be a resource unavailable for the control information.

For example, the terminal device may determine a symbol where an overlapping area between the first resource and the second resource is located as the resource unavailable for the control information.

In other words, for the transmission resource for the control information of the RMSI, after the terminal device determines the transmission period and transmission position of the first-type SSB, when the terminal device detects a PDCCH on the CORESET for the RMSI, if the CORESET and the transmission position of the first-type SSB overlap, the terminal device refrains from detecting a PDCCH on the symbol where the overlapping area is located.

Figure 4:
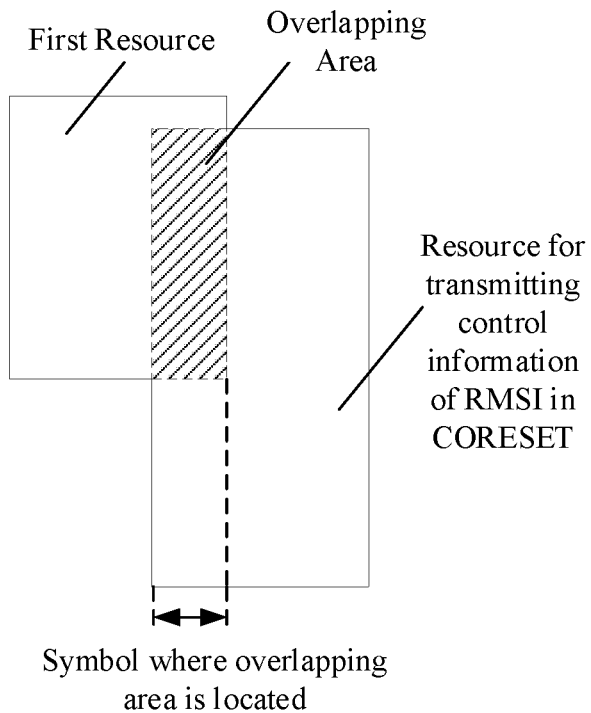
FIGS. 4 to 9 are schematic block diagrams showing unavailable resources according to embodiments of the present disclosure.

Taking FIG. 4 as an example, there is an overlapping area between the first resource and the resource for transmitting the control information of the RMSI in the control resource set. In this case, the terminal device can determine, from the resource for transmitting the control information of the RMSI in the control resource set, the symbol where the overlapping area is located as the resource unavailable for the control information.

In another example, the terminal device can determine, from the resource for transmitting the control information of the RMSI in the control resource set, a target candidate PDCCH that overlaps the first resource as the resource unavailable for the control information.

Here, the target candidate PDCCH may include a candidate PDCCH that overlaps the first resource by at least one Control Channel Element (CCE) or at least one Resource Element (RE).

Figure 5:
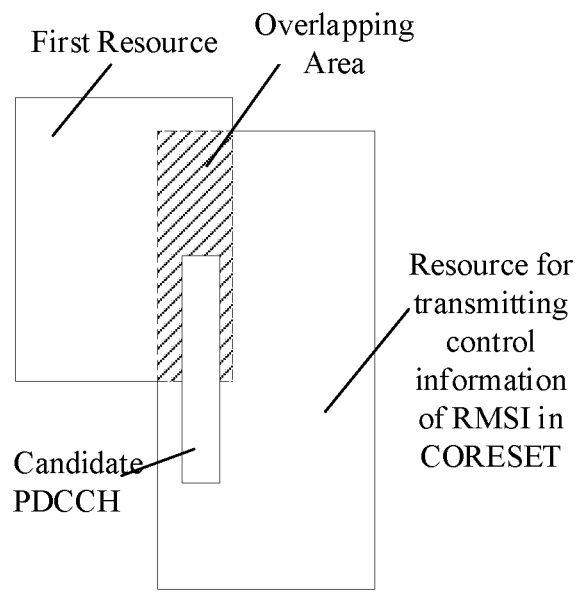

In other words, for the transmission resource for the control information of the RMSI, after the terminal device determines the transmission period and transmission position of the first-type SSB, when the terminal device detects a PDCCH for the RMSI, if any candidate PDCCH (or PDCCH candidate) overlaps the transmission position of the first-type SSB by at least one RE, the terminal device does not monitor the candidate PDCCH Taking FIG. 5 as an example, there is an overlapping area between the first resource and the resource for transmitting the control information of the RMSI in the control resource set. In this case, the terminal device can determine, from the second resource, the target candidate PDCCH that overlaps the first resource as the resource unavailable for the control information.

In another example, the terminal device may determine the unavailable resource when the first resource and the second resource are, or are not, Quasi-Co-Located (QCLed).

As an example, when the first resource and the second resource are not QCLed, the terminal device can determine the symbol where the overlapping area between the first resource and the second resource as the resource unavailable for the control information. As another example, when the first resource and the second resource are QCLed, the terminal device may determine the target candidate PDCCH as the resource unavailable for the control information.

In other words, for the transmission resource for the control information of the RMSI, after the terminal device determines the transmission period and transmission position of the first-type SSB, when the terminal device detects a PDCCH on the CORESET for the RMSI:

(1) if the CORESET and the transmission position of the first-type SSB overlap, and the CORESET and the first-type SSB are not QCLed, the terminal device does not detect the PDCCH on the symbol where the overlapping area is located.

Figure 6:
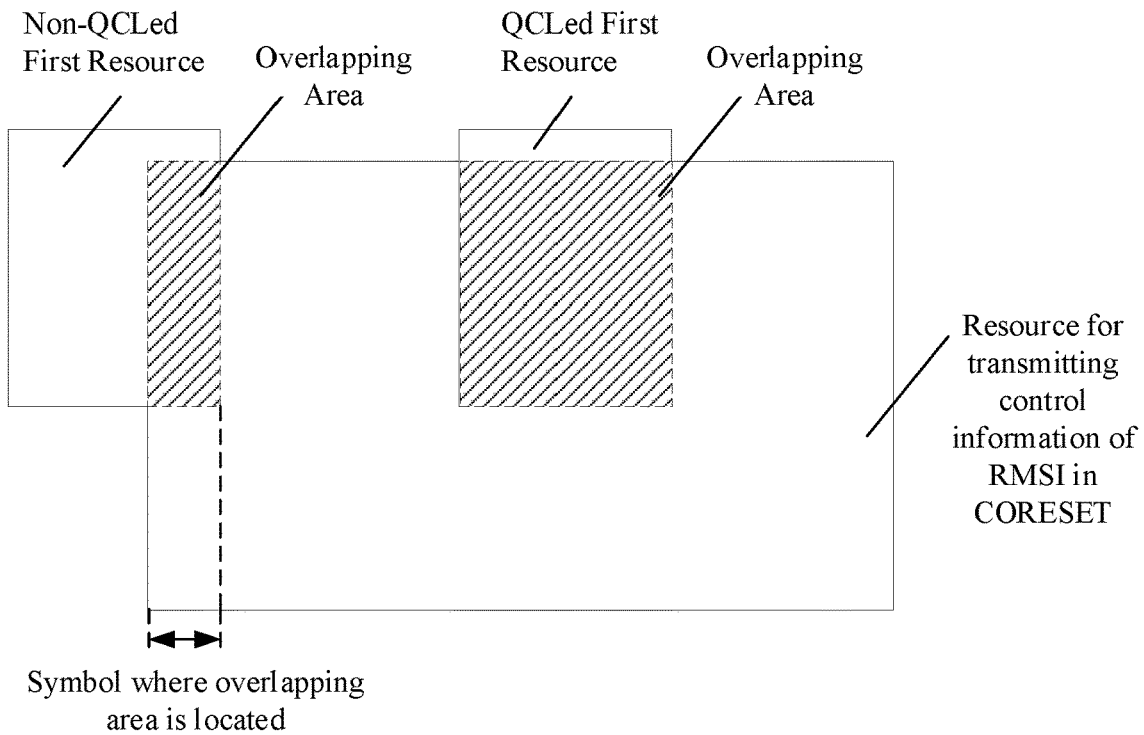

(2) if the CORESET and the transmission position of the first-type SSB overlap, and the CORESET and the first-type SSB are QCLed, if any candidate PDCCH (or PDCCH candidate) on the CORESET overlaps the transmission position of the SSB by at least one RE, the terminal device does not monitor the candidate PDCCH Taking FIG. 6 as an example, there is an overlapping area between the first resource and the resource for transmitting the control information of the RMSI in the control resource set. In this case, when the first resource and the second resource are not QCLed, the terminal device can determine the symbol where the overlapping area is located as the resource unavailable for the control information. Further, when the first resource and the second resource are QCLed, the terminal device can determine the target candidate PDCCH that overlaps the first resource as the resource unavailable for the control information.

In some other embodiments of the present disclosure, the terminal device can determines that the first-type SSB is not carried in the second resource.

In other words, when the terminal device detects Physical Downlink Control Channels (PDCCHs) for the RMSI, the terminal device assumes that no first-type SSB is transmitted on the resources where these PDCCHs are located.

In some embodiments of the present disclosure, the second resource may be a resource allocated for transmitting the data information of the RMSI, and the unavailable resource may be a resource unavailable for the data information.

For example, the terminal device does not expect that the first-type SSB would be transmitted on the resource for transmitting the control information of the RMSI in the control resource set. However, when the terminal device detects a PDSCH for the RMSI, the terminal device needs to consider the situation where the resource corresponding to the first-type SSB collides with the resource for the PDSCH.

In another example, when the terminal device detects a PDCCH for the RMSI, the terminal device needs to consider the situation where the resource corresponding to the first-type SSB collides with the resource for the PDCCH. Further, when the terminal device detects a PDSCH for the RMSI, the terminal device needs to consider the situation where the first-type SSB collides with the resource for the PDSCH.

The following case will be described below: when the terminal device detects a PDSCH of the RMSI, the terminal device needs to consider the situation where the resource corresponding to the first-type SSB collides with the resource for the PDSCH.

For example, the terminal device may determine a symbol where an overlapping area between the first resource and the second resource is located as the resource unavailable for the data information.

In other words, for the transmission resource for the data information of the RMSI, after the terminal device determines the transmission period and transmission position of the first-type SSB, if the time-frequency resource occupied by the data information of the RMSI overlaps the transmission resource for the first-type SSB, the terminal device can assume that no data information of the RMSI is transmitted on the symbol where the overlapping area is located.

Figure 7:
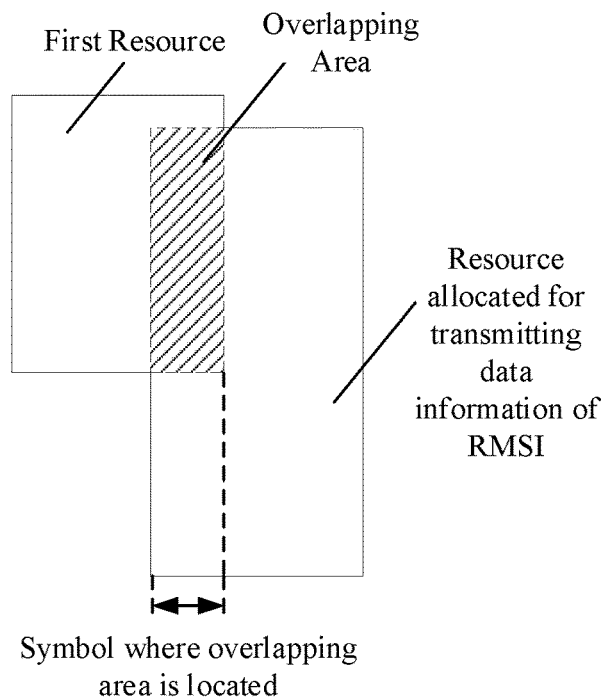

Taking FIG. 7 as an example, there is an overlapping area between the first resource and the resource allocated for transmitting the data information of the RMSI. In this case, the terminal device can determine, from the resource allocated for transmitting the data information of the RMSI, the symbol where the overlapping area is located as the resource unavailable for the data information.

In another example, the terminal device can determine a resource in the second resource that overlaps the first resource as the resource unavailable for the data information.

In other words, for the transmission resource for the data information of the RMSI, after the terminal device determines the transmission period and transmission position of the first-type SSB, if the time-frequency resource occupied by the data information of the RMSI overlaps the transmission resource for the first-type SSB, the terminal device can assume that no data information of the RMSI is transmitted in the overlapping area.

Figure 8:
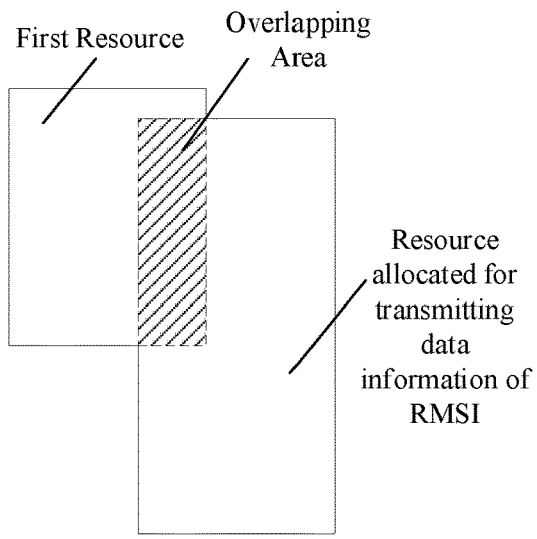

Taking FIG. 8 as an example, there is an overlapping area between the first resource and the resource allocated for transmitting the data information of the RMSI. In this case, the terminal device can determine, from the resource allocated for transmitting the data information of the RMSI, a resource that overlaps the first resource as the resource unavailable for the data information.

In another example, the terminal device may determine the resource unavailable for the data information from the resource allocated for transmitting the data information of the RMSI, when the first resource and the second resource are, or are not, Quasi-Co-Located (QCLed).

As an example, when the first resource and the second resource are not QCLed, the terminal device can determine the symbol where the overlapping area between the first resource and the second resource is located as the resource unavailable for the data information. As another example, when the first resource and the second resource are QCLed, the terminal device may determine the resource in the second resource that overlaps the first resource as the resource unavailable for the data information.

In other words, for the transmission resource for the data information of the RMSI, after the terminal device determines the transmission period and transmission position of the first-type SSB:

(1) If the time-frequency resource occupied by the data information of the RMSI overlaps the transmission resource of the first-type SSB, and the channel for transmitting the data information of the RMSI and the first-type SSB are not QCLed, the terminal device can assume that no data information of the RMSI is transmitted on the symbol where the overlapping area is located.

(2) If the time-frequency resource occupied by the data information of the RMSI overlaps the transmission resource of the first-type SSB, and the channel for transmitting the data information of the RMSI and the first-type SSB are QCLed, the terminal device can assume that no data information of the RMSI is transmitted in the overlapping area.

Figure 9:
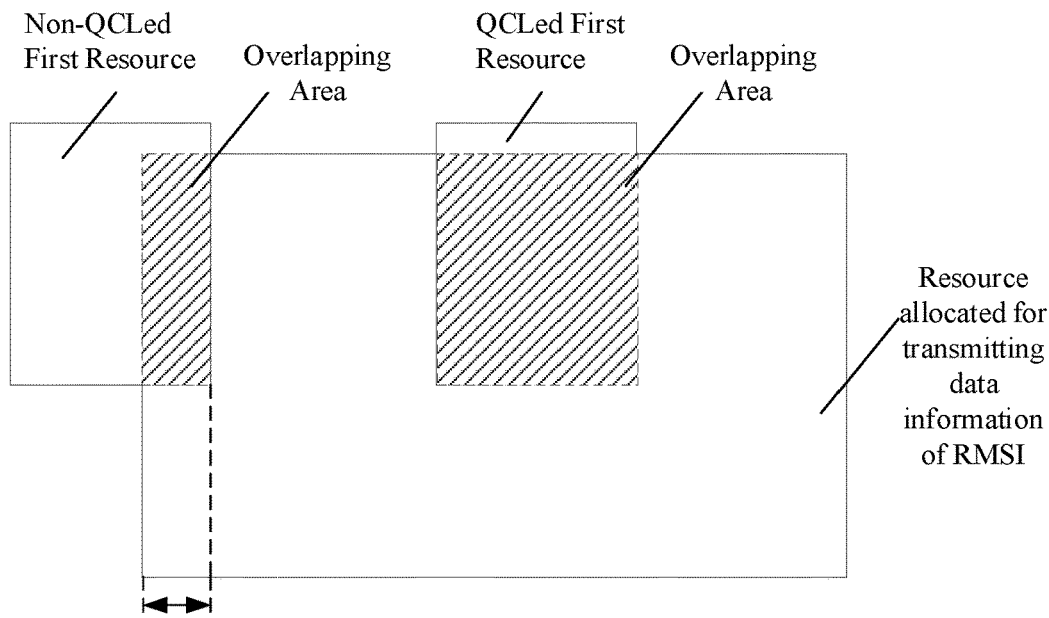

Taking FIG. 9 as an example, there is an overlapping area between the first resource and the resource allocated for transmitting the data information of the RMSI. In this case, when the first resource and the resource allocated for transmitting the data information of the RMSI are not QCLed, the terminal device can determine the symbol where the overlapping area is located as the resource unavailable for the data information. Further, when the first resource and the resource allocated for transmitting the data information of the RMSI are QCLed, the terminal device can determine the resource that overlaps the first resource as the resource unavailable for the data information.

In the following, the implementation scheme for the terminal device to determine the first resource in S210 will be described.

In some embodiments of the present disclosure, the terminal device can determine the first resource in a resource period of the first-type SSB.

For example, the terminal device can determine all candidate resources for the first-type SSB in the resource period as the first resource.

In other words, the terminal device may assume by default that all positions on which the first-type SSBs can be transmitted in the period have the first-type SSBs transmitted thereon. For example, if a maximum number of the first-type SSBs that can be transmitted is 8, when the terminal device detects one target SSB belonging to the first-type SSB, the terminal device can determine that the time-frequency resource positions where a set of eight first-type SSBs determined based on the target SSB are located cannot be used as resource mapping positions for the control and data information of the RMSI. That is, after the terminal device determines the period information of the first-type SSB, the terminal device can determine that this set of 8 first-type SSBs periodically exists at a predetermined period T, and the determined unavailable resources also exist periodically.

In another example, the terminal device can determine a resource carrying the first-type SSB in the resource period as the first resource.

In some embodiments of the present disclosure, the method 200 may further include: receiving, by the terminal device, first indication information transmitted by a network device, the first indication information indicating whether each candidate resource of the first-type SSB in the resource period carries the first-type SSB.

Further, the terminal device may determine the candidate resource carrying the first-type SSB as indicated by the first indication information as the first resource.

In other words, the terminal device may determine the transmission condition of the first-type SSB based on the first indication information. In this case, the network device can directly indicate the current SSB transmission condition to the terminal device. The SSB transmission condition here refers to the transmission condition of the first-type SSB on the non-synchronization raster frequency point, and in particular the transmission condition of a set of transmitted SSBs, for the terminal device to avoid the resource position of the first-type SSB when determining the available time-frequency resource mapping position for the RMSI.

For example, the first indication information may indicate whether each candidate resource of the first-type SSB in the resource period carries the SSB via a bit sequence, each bit in the bit sequence indicating whether the candidate resource corresponding to the bit among all the candidate resources carries the first-type SSB.

In other words, the first indication information may use M-bit information to indicate the transmission condition of the first-type SSB. For example, an M-bit bitmap may indicate the transmission condition of M SSBs, where 0 represents no SSB transmitted and 1 represents SSB transmitted. The terminal device may determine the time-frequency transmission resources for the first-type SSBs based on the first indication information, and in turn determine these resources as unavailable resources for the RMSI resource mapping.

In some embodiments of the present disclosure, second indication information may indicate whether each candidate resource of the first-type SSB in the resource period carries the first-type SSB by reusing at least one bit in an information field in a Physical Broadcast Channel (PBCH) or at least one bit in an information field in a System Information Block (MIB).

Here, the information field in the PBCH may include at least one of:
an information field carrying a System Frame Number (SFN);
an information field carrying a subcarrier offset condition;
an information field carrying a half-frame indication; and
an information field carrying an index of the SSB.

Further, the information field in the MIB may include at least one of:
an information field carrying a System Frame Number (SFN);
an information field carrying a subcarrier offset condition;
an information field carrying configuration information of System Information SIB1;
an information field carrying cell bar access information;

an information field carrying intra-frequency reselection information; and an idle field.

In a specific implementation, the first indication information can reuse some fields in the payload of the PBCH. For example, one or more bits in the 4-bit information carrying the SFN in the payload of the PBCH can be reused, the 1-bit information carrying the half-frame indication in the payload of the PBCH can be reused, one or more bits in the 3-bit information carrying the index of the SSB in the payload of the PBCH can be reused, or the 1-bit information carrying the sub-carrier offset condition in the payload of the PBCH can be reused. Alternatively, the first indication information may reuse some fields in the MIB. For example, one or more bits in the 6-bit information carrying the SFN in the MIB can be reused, one or more bits in the 4-bit information carrying the sub-carrier offset condition in the MIB can be reused, one or more bits in the 8-bit information carrying the configuration information of SIB1 in the MIB can be reused, the 1-bit information carrying the cell bar access information in the MIB can be reused, the 1-bit information carrying the intra-frequency reselection information in the MIB can be reused, or the idle field information in the existing MIB can be reused.

In another example, the first indication information may indicate whether each candidate resource of the first-type SSB in the resource period carries the first-type SSB via Demodulation Reference Signals (DMRSs) of different Physical Broadcast Channels (PBCHs).

In other words, the first indication information may be transmitted via the MIB, the payload of the PBCH, or the DMRS sequence of the PBCH, to ensure that the terminal device can obtain the transmission position information of the first-type SSB before determining the resource position for the DMRS, such that the terminal device can determine the resource that can be mapped to the RMSI based on the transmission position information of the first-type SSB.

In another example, the control information of the RMSI may include the first indication information.

In some embodiments of the present disclosure, the method 200 may further include: receiving, by the terminal device, second indication information transmitted by a network device, the second indication information indicating a number of first-type SSBs carried in the resource period.

Further, the terminal device may determine a number of consecutive resources that is the same as the number of first-type SSBs in the resource period as the first resource.

In other words, the second indication information may use an L-bit information to indicate the transmission condition of the first-type SSB. For example, M bits can be used to indicate the number of first-type SSBs actually transmitted. For example, the first-type SSBs may be transmitted or received on consecutive resources. For example, when the M bits indicate that the number of first-type SSBs actually transmitted is 4, then four consecutive first-type SSBs are transmitted in their respective available transmission positions in sequence. It has two characteristics:

(1) constraining continuous transmission of first-type SSBs for measurement in NR-U; and (2) indicating the number of transmitted first-type SSBs, for determining the resource positions of the transmitted SSB, such that the terminal device can determine these resources as unavailable resources for the resource mapping for the RMSI.

For example, the second indication information may indicate the number of first-type SSBs carried in the resource period by reusing at least one bit in an information field in a Physical Broadcast Channel (PBCH) or at least one bit in an information field in a System Information Block (MIB).

Here, the information field in the PBCH may include at least one of:

an information field carrying a System Frame Number (SFN);

an information field carrying a subcarrier offset condition;

an information field carrying a half-frame indication; and an information field carrying an index of the SSB.

Further, the information field in the MIB may include at least one of:

an information field carrying a System Frame Number (SFN);

an information field carrying a subcarrier offset condition;

an information field carrying configuration information of System Information SIB1;

an information field carrying cell bar access information;

an information field carrying intra-frequency reselection information; and an idle field.

In a specific implementation, the second indication information can reuse some fields in the payload of the PBCH. For example, one or more bits in the 4-bit information carrying the SFN in the payload of the PBCH can be reused, the 1-bit information carrying the half-frame indication in the payload of the PBCH can be reused, one or more bits in the 3-bit information carrying the index of the SSB in the payload of the PBCH can be reused, or the 1-bit information carrying the sub-carrier offset condition in the payload of the PBCH can be reused. Alternatively, the second indication information may reuse some fields in the MIB. For example, one or more bits in the 6-bit information carrying the SFN in the MIB can be reused, one or more bits in the 4-bit information carrying the sub-carrier offset condition in the MIB can be reused, one or more bits in the 8-bit information carrying the configuration information of SIB1 in the MIB can be reused, the 1-bit information carrying the cell bar access information in the MIB can be reused, the 1-bit information carrying the intra-frequency reselection information in the MIB can be reused, or the idle field information in the existing MIB can be reused.

In another example, the second indication information may indicate the number of first-type SSBs carried in the resource period by the Demodulation Reference Signal (DMRS) of the Physical Broadcast Channel (PBCH).

In other words, the second indication information may be transmitted via the MIB, the payload of the PBCH, or the DMRS sequence of the PBCH, to ensure that the terminal device can obtain the transmission position information of the first-type SSB before determining the resource position for the DMRS, such that the terminal device can determine the resource that can be mapped to the RMSI based on the transmission position information of the first-type SSB.

In another example, the control information of the RMSI may include the second indication information.

In some embodiments of the present disclosure, the method 200 may further include: determining, by the terminal device, a resource period of the first-type SSB For example, the resource period may be a predefined period or a configured period, or the resource period may be a maximum or minimum value of a plurality of configured periods, or the resource period may be a period between the maximum value and the minimum value of the plurality of configuration periods.

In other words, the period of the first-type SSB may have many configurations (for example, T1, T2, . . . Tk, in an ascending order, e.g., 5 ms, 10 ms, 20 ms, 40 ms, 80 ms, 160 ms). Further, when the complexity of direct indication and the issue of bit overhead are taken into account, when determining the available resource for the resource mapping for the RMSI, the terminal device may assume by default the period of the first-type SSB as T.

When the resource period is the minimum value as an example, T as assumed by the terminal device by default may be the minimum period T1 in the period configuration of the SSB, e.g., T as assumed by the terminal device by default may be 5 ms. Further, no matter how long the actual transmission period of the first-type SSB is, the terminal device will not consider the resource position at which the first-type SSB is actually transmitted as a resource position available for transmitting the control information or the data information of the RMSI.

When the resource period is the maximum value as an example, T as assumed by the terminal device by default may be the maximum period Tk in the period configuration of the SSB, e.g., T as assumed by the terminal device by default may be 160 ms. In this case, the terminal device assumes by default that all the resource positions for transmitting the first-type SSBs have the first-type SSBs actually transmitted thereon.

When the resource period is a specific period value, for example, T as assumed by the terminal device by default may be 10 ms. This option is based on the above two options, while taking into account that the above problems that the terminal device may determine too many time-frequency resources as the resources unavailable for resource mapping and that the terminal device may determine the transmission positions at which the first-type SSBs are actually transmitted as the resources available for resource mapping. Similarly, the network device can also refer to the default information when scheduling the first-type SSBs, i.e., using the period T assumed by the terminal device by default as the actual transmission period of the first-type SSBs.

In some embodiments of the present disclosure, the method 200 may further include: receiving, by the terminal device, third indication information transmitted by a network device, the third indication information indicating the resource period.

In other words, the terminal device may determine the period information of the first-type SSB transmission based on the third indication information. In this case, the network device can directly indicate the current transmission period of the first-type SSB to the terminal device, such that the terminal device can avoid the resource position of the SSB when determining the available time-frequency resource mapping position for the RMSI.

For example, the third indication information may use N-bit information to indicate the transmission period of the first-type SSB. For example, 2-bit information may indicate a period of 10 ms, 20 ms, 40 ms, or 80 ms, or 3-bit information may indicate a period of 5 ms, 10 ms, 20 ms, 40 ms, 80 ms, or 160 ms.

In another example, the third indication information may indicate the resource period by reusing at least one bit in an information field in a Physical Broadcast Channel (PBCH) or at least one bit in an information field in a System Information Block (MIB).

Here, the information field in the PBCH may include at least one of:
an information field carrying a System Frame Number (SFN);
an information field carrying a subcarrier offset condition;
an information field carrying a half-frame indication; and
an information field carrying an index of the SSB.

Further, the information field in the MIB may include at least one of:
an information field carrying a System Frame Number (SFN);
an information field carrying a subcarrier offset condition;
an information field carrying configuration information of System Information SIB1;
an information field carrying cell bar access information;
an information field carrying intra-frequency reselection information; and
an idle field.

In a specific implementation, the third indication information can reuse some fields in the payload of the PBCH. For example, one or more bits in the 4-bit information carrying the SFN in the payload of the PBCH can be reused, the 1-bit information carrying the half-frame indication in the payload of the PBCH can be reused, one or more bits in the 3-bit information carrying the index of the SSB in the payload of the PBCH can be reused, or the 1-bit information carrying the sub-carrier offset condition in the payload of the PBCH can be reused. Alternatively, the third indication information may reuse some fields in the MIB. For example, one or more bits in the 6-bit information carrying the SFN in the MIB can be reused, one or more bits in the 4-bit information carrying the sub-carrier offset condition in the MIB can be reused, one or more bits in the 8-bit information carrying the configuration information of SIB1 in the MIB can be reused, the 1-bit information carrying the cell bar access information in the MIB can be reused, the 1-bit information carrying the intra-frequency reselection information in the MIB can be reused, or the idle field information in the existing MIB can be reused.

In another example, the third indication information may indicate the resource period via a Demodulation Reference Signal (DMRS) of a Physical Broadcast Channel (PBCH).

In another example, the control information of the RMSI may include the third indication information.

In some embodiments of the present disclosure, the method 200 may further include: determining, by the terminal device, a resource other than the unavailable resource in the first resource as an available resource for the RMSI; and receiving, by the terminal device, control information or data information of the RMSI on the available resource for the RMSI.

In other words, the terminal device can determine the available resource for the RMSI based on the unavailable resource, and then perform resource mapping on the available resource.

The preferred embodiments of the present disclosure have been described in detail above with reference to the accompanying drawings. However, the present disclosure is not limited to the specific details in the above embodiments. Various alternatives can be made to the technical solutions of the present disclosure within the scope of the technical concept of the present disclosure, and these alternatives all belong to the scope of the present disclosure.

For example, the various technical features described in the above specific embodiments can be combined in any suitable manner provided that they do not conflict. In order to avoid unnecessary redundancy, details of various possible combinations will not be described in the present disclosure.

In another example, various different implementations of the present disclosure can also be combined arbitrarily, as long as they do not violate the concept of the present disclosure. Such combinations should also be regarded as the content disclosed in the present disclosure.

It can be appreciated that, in the various method embodiments of the present disclosure, the values of the sequence numbers of the above processes does not mean the order in which they are performed. The order in which the respective processes are to be performed should be determined by their functions and internal logics, and should not constitute any limitation on the implementation of the embodiments of the present disclosure.

The method for determining the unavailable resource according to the embodiment of the present disclosure has been described above in detail from the perspective of the terminal device with reference to FIGS. 2 to 9. In the following, a method for determining an unavailable resource according to the embodiment of the present disclosure will be described from the perspective of a network device with reference to FIG. 10.

Figure 10:
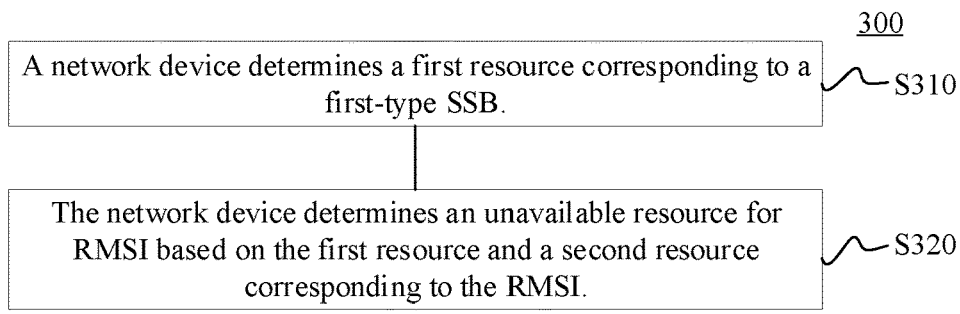
FIG. 10 is a schematic flowchart of a method in a network device for determining an unavailable resource according to an embodiment of the present disclosure.

FIG. 10 shows a schematic flowchart of a method 300 in a network device for determining an unavailable resource according to an embodiment of the present disclosure. The method 300 may be performed by the network device as shown in FIG. 1.

As shown in FIG. 10, the method 300 may include the following steps.

At S310, the network device determines a first resource corresponding to a first-type Synchronization Signal Block (SSB).

At S320, the network device determines an unavailable resource for Remaining System Information (RMSI) based on the first resource and a second resource corresponding to the RMSI.

Here, the first-type SSB is an SSB transmitted on a non-Synchronization Signal (SS) raster.

In some embodiments of the present disclosure, the second resource may be a resource in a control resource set that is to be used for transmitting control information of the RMSI, and the unavailable resource may be a resource unavailable for the control information.

In some embodiments of the present disclosure, the network device may determine a symbol where an overlapping area between the first resource and the second resource is located as the resource unavailable for the control information.

In some embodiments of the present disclosure, when the first resource and the second resource are not Quasi-Co-Located (QCLed), the network device may determine the symbol where the overlapping area between the first resource and the second resource is located as the resource unavailable for the control information.

In some embodiments of the present disclosure, the network device may determine, from the second resource, a target candidate Physical Downlink Control Channel (PDCCH) that overlaps the first resource as the resource unavailable for the control information.

In some embodiments of the present disclosure, the network device may determine the target candidate PDCCH as the resource unavailable for the control information when the first resource and the second resource are Quasi-Co-Located (QCLed).

In some embodiments of the present disclosure, the target candidate PDCCH may include a candidate PDCCH that overlaps the first resource by at least one Control Channel Element (CCE) or at least one Resource Element (RE).

In some embodiments of the present disclosure, the network device may determine that the first-type SSB is not carried in the second resource.

In some embodiments of the present disclosure, the second resource may be a resource allocated for transmitting data information of the RMSI, and the unavailable resource may be a resource unavailable for the data information.

In some embodiments of the present disclosure, the network device may determine a symbol where an overlapping area between the first resource and the second resource is located as the resource unavailable for the data information.

In some embodiments of the present disclosure, when the first resource and the second resource are not Quasi-Co-Located (QCLed), the network device may determine the symbol where the overlapping area between the first resource and the second resource is located as the resource unavailable for the data information.

In some embodiments of the present disclosure, the network device may determine a resource in the second resource that overlaps the first resource as the resource unavailable for the data information.

In some embodiments of the present disclosure, the network device may determine the resource in the second resource that overlaps the first resource as the resource unavailable for the data information when the first resource and the second resource are Quasi-Co-Located (QCLed).

In some embodiments of the present disclosure, the network device may determine the first resource in a resource period of the first-type SSB.

In some embodiments of the present disclosure, the network device may determine all candidate resources for the first-type SSB in the resource period as the first resource.

In some embodiments of the present disclosure, the network device may determine a resource carrying the first-type SSB in the resource period as the first resource.

In some embodiments of the present disclosure, the method 300 may further include: transmitting, by the network device, first indication information to a terminal device, the first indication information indicating whether each candidate resource of the first-type SSB in the resource period carries the first-type SSB.

In some embodiments of the present disclosure, the first indication information may indicate whether each candidate resource of the first-type SSB in the resource period carries the SSB via a bit sequence, each bit in the bit sequence indicating whether the candidate resource corresponding to the bit among all the candidate resources carries the first-type SSB.

In some embodiments of the present disclosure, second indication information may indicate whether each candidate resource of the first-type SSB in the resource period carries the first-type SSB by reusing at least one bit in an information field in a Physical Broadcast Channel (PBCH) or at least one bit in an information field in a System Information Block (MIB).

In some embodiments of the present disclosure, the information field in the PBCH may include at least one of:
an information field carrying a System Frame Number (SFN);
an information field carrying a subcarrier offset condition;
an information field carrying a half-frame indication; and
an information field carrying an index of the SSB.

In some embodiments of the present disclosure, the information field in the MIB may include at least one of:
an information field carrying a System Frame Number (SFN);
an information field carrying a subcarrier offset condition;
an information field carrying configuration information of System Information SIB1;
an information field carrying cell bar access information;

an information field carrying intra-frequency reselection information; and an idle field.

In some embodiments of the present disclosure, the first indication information may indicate whether each candidate resource of the first-type SSB in the resource period carries the first-type SSB via Demodulation Reference Signals (DMRSs) of different Physical Broadcast Channels (PBCHs).

In some embodiments of the present disclosure, the control information of the RMSI may include the first indication information.

In some embodiments of the present disclosure, the method 300 may further include: transmitting, by the network device, second indication information to a terminal device, the second indication information indicating a number of first-type SSBs carried in the resource period.

In some embodiments of the present disclosure, the second indication information may indicate the number of first-type SSBs carried in the resource period by reusing at least one bit in an information field in a Physical Broadcast Channel (PBCH) or at least one bit in an information field in a System Information Block (MIB).

In some embodiments of the present disclosure, the information field in the PBCH may include at least one of:

an information field carrying a System Frame Number (SFN);

an information field carrying a subcarrier offset condition;

an information field carrying a half-frame indication; and an information field carrying an index of the SSB.

In some embodiments of the present disclosure, the information field in the MIB may include at least one of:

an information field carrying a System Frame Number (SFN);

an information field carrying a subcarrier offset condition;

an information field carrying configuration information of System Information SIB1;

an information field carrying cell bar access information;

an information field carrying intra-frequency reselection information; and an idle field.

In some embodiments of the present disclosure, the second indication information may indicate the number of first-type SSBs carried in the resource period via a Demodulation Reference Signal (DMRS) of a Physical Broadcast Channel (PBCH).

In some embodiments of the present disclosure, the control information of the RMSI may include the second indication information.

In some embodiments of the present disclosure, the method 300 may further include: determining, by the network device, a resource period of the first-type SSB.

In some embodiments of the present disclosure, the resource period may be a predefined period or a configured period, or the resource period may be a maximum or minimum value of a plurality of configured periods, or the resource period may be a period between the maximum value and the minimum value of the plurality of configuration periods.

In some embodiments of the present disclosure, the method 300 may further include: transmitting, by the network device, third indication information to a terminal device, the third indication information indicating the resource period.

In some embodiments of the present disclosure, the third indication information may indicate the resource period by reusing at least one bit in an information field in a Physical Broadcast Channel (PBCH) or at least one bit in an information field in a System Information Block (MIB).

In some embodiments of the present disclosure, the information field in the PBCH may include at least one of:

an information field carrying a System Frame Number (SFN);

an information field carrying a subcarrier offset condition;

an information field carrying a half-frame indication; and an information field carrying an index of the SSB.

In some embodiments of the present disclosure, the information field in the MIB may include at least one of:

an information field carrying a System Frame Number (SFN);

an information field carrying a subcarrier offset condition;

an information field carrying configuration information of System Information SIB1;

an information field carrying cell bar access information;

an information field carrying intra-frequency reselection information; and an idle field.

In some embodiments of the present disclosure, the third indication information may indicate the resource period via a Demodulation Reference Signal (DMRS) of a Physical Broadcast Channel (PBCH).

In some embodiments of the present disclosure, the control information of the RMSI may include the third indication information.

In some embodiments of the present disclosure, the method 300 may further include:

determining, by the network device, a resource other than the unavailable resource in the first resource as an available resource for the RMSI; and transmitting, by the network device, control information or data information of the RMSI to a terminal device on the available resource for the RMSI.

In some embodiments of the present disclosure, the first-type SSB may include an SSB carrying a Physical Cell Identity (PCI) and a System Information Block (MIB).

In some embodiments of the present disclosure, the method 300 is applicable to a New Radio Unlicensed (NR-U) communication network.

It can be appreciated that, for the steps in the method 300 in the network device for determining the unavailable resource, reference can be made to the corresponding steps in the method 200 in the terminal device for determining the unavailable resource, and description thereof will be omitted here for simplicity.

The method embodiments of the present disclosure have been described in detail above with reference to FIGS. 1 to 10, and the apparatus embodiments of the present disclosure will be described in detail below with reference to FIGS. 11 to 14.

Figure 11:
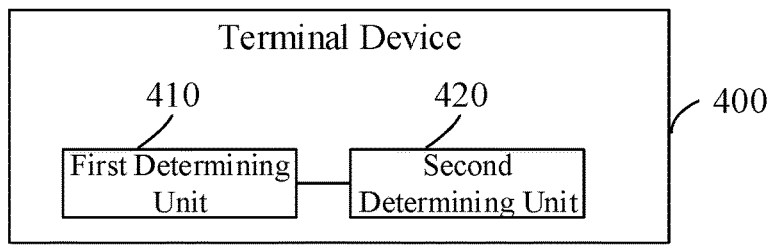
FIG. 11 is a schematic block diagram of a terminal device according to an embodiment of the present disclosure.

FIG. 11 is a schematic block diagram of a terminal device 400 according to an embodiment of the present disclosure.

Referring to FIG. 11, the terminal device 400 may include:

a first determining unit 410 configured to determine a first resource corresponding to a first-type Synchronization Signal Block (SSB); and a second determining unit 420 configured to determine an unavailable resource for Remaining System Information (RMSI) based on the first resource and a second resource corresponding to the RMSI.

Here, the first-type SSB is an SSB transmitted on a non-Synchronization Signal (SS) raster.

In some embodiments of the present disclosure, the second resource may be a resource in a control resource set that is to be used for transmitting control information of the RMSI, and the unavailable resource may be a resource unavailable for the control information.

In some embodiments of the present disclosure, the second determining unit 420 may be configured to: determine a symbol where an overlapping area between the first resource and the second resource is located as the resource unavailable for the control information.

In some embodiments of the present disclosure, the second determining unit 420 may be configured to: determine, when the first resource and the second resource are not Quasi-Co-Located (QCLed), the symbol where the overlapping area between the first resource and the second resource is located as the resource unavailable for the control information.

In some embodiments of the present disclosure, the second determining unit 420 may be configured to: determine, from the second resource, a target candidate Physical Downlink Control Channel (PDCCH) that overlaps the first resource as the resource unavailable for the control information.

In some embodiments of the present disclosure, the second determining unit 420 may be configured to: determine the target candidate PDCCH as the resource unavailable for the control information when the first resource and the second resource are Quasi-Co-Located (QCLed).

In some embodiments of the present disclosure, the target candidate PDCCH may be a candidate PDCCH that overlaps the first resource by at least one Control Channel Element (CCE) or at least one Resource Element (RE).

In some embodiments of the present disclosure, the second determining unit 420 may be configured to: determine that the first-type SSB is not carried in the second resource.

In some embodiments of the present disclosure, the second resource may be a resource allocated for transmitting data information of the RMSI, and the unavailable resource may be a resource unavailable for the data information.

In some embodiments of the present disclosure, the second determining unit 420 may be configured to: determine a symbol where an overlapping area between the first resource and the second resource is located as the resource unavailable for the data information.

In some embodiments of the present disclosure, the second determining unit 420 may be configured to: determine, when the first resource and the second resource are not Quasi-Co-Located (QCLed), the symbol where the overlapping area between the first resource and the second resource is located as the resource unavailable for the data information.

In some embodiments of the present disclosure, the second determining unit 420 may be configured to: determine a resource in the second resource that overlaps the first resource as the resource unavailable for the data information.

In some embodiments of the present disclosure, the second determining unit 420 may be configured to: determine the resource in the second resource that overlaps the first resource as the resource unavailable for the data information when the first resource and the second resource are Quasi-Co-Located (QCLed).

In some embodiments of the present disclosure, the first determining unit 410 may be configured to: determine the first resource in a resource period of the first-type SSB.

In some embodiments of the present disclosure, the first determining unit 410 may be configured to: determine all candidate resources for the first-type SSB in the resource period as the first resource.

In some embodiments of the present disclosure, the first determining unit 410 may be configured to: determine a resource carrying the first-type SSB in the resource period as the first resource.

In some embodiments of the present disclosure, the terminal device may further include a first receiving unit configured to receive first indication information transmitted by a network device, the first indication information indicating whether each candidate resource of the first-type SSB in the resource period carries the first-type SSB. The first determining unit 410 may be configured to: determine the candidate resource carrying the first-type SSB as indicated by the first indication information as the first resource.

In some embodiments of the present disclosure, the first indication information may indicate whether each candidate resource of the first-type SSB in the resource period carries the SSB via a bit sequence, each bit in the bit sequence indicating whether the candidate resource corresponding to the bit among all the candidate resources carries the first-type SSB.

In some embodiments of the present disclosure, second indication information may indicate whether each candidate resource of the first-type SSB in the resource period carries the first-type SSB by reusing at least one bit in an information field in a Physical Broadcast Channel (PBCH) or at least one bit in an information field in a System Information Block (MIB).

In some embodiments of the present disclosure, the information field in the PBCH may include at least one of:
an information field carrying a System Frame Number (SFN);
an information field carrying a subcarrier offset condition;
an information field carrying a half-frame indication; and
an information field carrying an index of the SSB.

In some embodiments of the present disclosure, the information field in the MIB may include at least one of:
an information field carrying a System Frame Number (SFN);
an information field carrying a subcarrier offset condition;
an information field carrying configuration information of System Information SIB1;
an information field carrying cell bar access information;
an information field carrying intra-frequency reselection information; and
an idle field.

In some embodiments of the present disclosure, the first indication information may indicate whether each candidate resource of the first-type SSB in the resource period carries the first-type SSB via Demodulation Reference Signals (DMRSs) of different Physical Broadcast Channels (PBCHs).

In some embodiments of the present disclosure, the control information of the RMSI may include the first indication information.

In some embodiments of the present disclosure, the terminal device may further includes a second receiving unit configured to receive second indication information transmitted by a network device, the second indication information indicating a number of first-type SSBs carried in the resource period. The first determining unit 410 may be configured to: determine a number of consecutive resources that is the same as the number of the SSBs in the resource period as the first resource.

In some embodiments of the present disclosure, the second indication information may indicate the number of first-type SSBs carried in the resource period by reusing at least one bit in an information field in a Physical Broadcast Channel (PBCH) or at least one bit in an information field in a System Information Block (MIB).

In some embodiments of the present disclosure, the information field in the PBCH may include at least one of:
- an information field carrying a System Frame Number (SFN);
- an information field carrying a subcarrier offset condition;
- an information field carrying a half-frame indication; and
- an information field carrying an index of the SSB.

In some embodiments of the present disclosure, the information field in the MIB may include at least one of:
- an information field carrying a System Frame Number (SFN);
- an information field carrying a subcarrier offset condition;
- an information field carrying configuration information of System Information SIB1;
- an information field carrying cell bar access information;
- an information field carrying intra-frequency reselection information; and
- an idle field.

In some embodiments of the present disclosure, the second indication information may indicate the number of first-type SSBs carried in the resource period via a Demodulation Reference Signal (DMRS) of a Physical Broadcast Channel (PBCH).

In some embodiments of the present disclosure, the control information of the RMSI may include the second indication information.

In some embodiments of the present disclosure, the first determining unit 410 may be further configured to: determine a resource period of the first-type SSB In some embodiments of the present disclosure, the resource period may be a predefined period or a configured period, or the resource period may be a maximum or minimum value of a plurality of configured periods, or the resource period may be a period between the maximum value and the minimum value of the plurality of configuration periods.

In some embodiments of the present disclosure, the terminal device may further include: a third receiving unit configured to receive third indication information transmitted by a network device, the third indication information indicating the resource period In some embodiments of the present disclosure, the third indication information may indicate the resource period by reusing at least one bit in an information field in a Physical Broadcast Channel (PBCH) or at least one bit in an information field in a System Information Block (MIB).

In some embodiments of the present disclosure, the information field in the PBCH may include at least one of:
- an information field carrying a System Frame Number (SFN);
- an information field carrying a subcarrier offset condition;
- an information field carrying a half-frame indication; and
- an information field carrying an index of the SSB.

In some embodiments of the present disclosure, the information field in the MIB may include at least one of:
- an information field carrying a System Frame Number (SFN);
- an information field carrying a subcarrier offset condition;
- an information field carrying configuration information of System Information SIB1;
- an information field carrying cell bar access information;
- an information field carrying intra-frequency reselection information; and
- an idle field.

In some embodiments of the present disclosure, the third indication information may indicate the resource period via a Demodulation Reference Signal (DMRS) of a Physical Broadcast Channel (PBCH).

In some embodiments of the present disclosure, the control information of the RMSI may include the third indication information.

In some embodiments of the present disclosure, the second determining unit 420 may be further configured to: determine a resource other than the unavailable resource in the first resource as an available resource for the RMSI; and receive control information or data information of the RMSI on the available resource for the RMSI.

In some embodiments of the present disclosure, the first-type SSB may include an SSB carrying a Physical Cell Identity (PCI) and a System Information Block (MIB).

In some embodiments of the present disclosure, the terminal device may be applicable to a New Radio Unlicensed (NR-U) communication network.

It can be appreciated that the apparatus embodiment and the method embodiment may correspond to each other, and for similar descriptions, reference can be made to the method embodiment. In particular, the terminal device 400 shown in FIG. 11 may correspond to an entity performing the method 200 according to the embodiment of the present disclosure, and the above and other operations and/or functions of the respective units in the terminal device 400 are for implementing the respective procedures in the method shown in FIG. 3, and detailed description thereof will be omitted here for simplicity.

Figure 12:
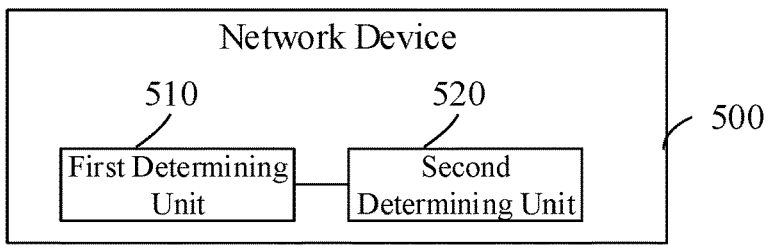
FIG. 12 is a schematic block diagram of a network device according to an embodiment of the present disclosure.

FIG. 12 is a schematic block diagram of a network device 500 according to an embodiment of the present disclosure.

Referring to FIG. 12, the network device 500 may include:
- a first determining unit 510 configured to determine a first resource corresponding to a first-type Synchronization Signal Block (SSB); and
- a second determining unit 520 configured to determine an unavailable resource for Remaining System Information (RMSI) based on the first resource and a second resource corresponding to the RMSI.

Here, the first-type SSB is an SSB transmitted on a non-Synchronization Signal (SS) raster.

In some embodiments of the present disclosure, the second resource may be a resource in a control resource set that is to be used for transmitting control information of the RMSI, and the unavailable resource may be a resource unavailable for the control information.

In some embodiments of the present disclosure, the second determining unit 520 may be configured to: determine a symbol where an overlapping area between the first resource and the second resource is located as the resource unavailable for the control information.

In some embodiments of the present disclosure, the second determining unit 520 may be configured to: determine, when the first resource and the second resource are not Quasi-Co-Located (QCLed), the symbol where the overlapping area between the first resource and the second resource is located as the resource unavailable for the control information.

In some embodiments of the present disclosure, the second determining unit 520 may be configured to determine, from the second resource, a target candidate Physical Downlink Control Channel (PDCCH) that overlaps the first resource as the resource unavailable for the control information.

In some embodiments of the present disclosure, the second determining unit 520 may be configured to: determine the target candidate PDCCH as the resource unavailable for the control information when the first resource and the second resource are Quasi-Co-Located (QCLed).

In some embodiments of the present disclosure, the target candidate PDCCH may include a candidate PDCCH that overlaps the first resource by at least one Control Channel Element (CCE) or at least one Resource Element (RE).

In some embodiments of the present disclosure, the second determining unit 520 may be configured to: determine that the first-type SSB is not carried in the second resource.

In some embodiments of the present disclosure, the second resource may be a resource allocated for transmitting data information of the RMSI, and the unavailable resource may be a resource unavailable for the data information.

In some embodiments of the present disclosure, the second determining unit 520 may be configured to: determine a symbol where an overlapping area between the first resource and the second resource is located as the resource unavailable for the data information.

In some embodiments of the present disclosure, the second determining unit 520 may be configured to: determine, when the first resource and the second resource are not Quasi-Co-Located (QCLed), the symbol where the overlapping area between the first resource and the second resource is located as the resource unavailable for the data information.

In some embodiments of the present disclosure, the second determining unit 520 may be configured to: determine a resource in the second resource that overlaps the first resource as the resource unavailable for the data information.

In some embodiments of the present disclosure, the second determining unit 520 may be configured to: determine the resource in the second resource that overlaps the first resource as the resource unavailable for the data information when the first resource and the second resource are Quasi-Co-Located (QCLed).

In some embodiments of the present disclosure, the first determining unit 510 may be configured to: determine the first resource in a resource period of the first-type SSB.

In some embodiments of the present disclosure, the first determining unit 510 may be configured to: determine all candidate resources for the first-type SSB in the resource period as the first resource.

In some embodiments of the present disclosure, the first determining unit 510 may be configured to: determine a resource carrying the first-type SSB in the resource period as the first resource.

In some embodiments of the present disclosure, the network device may further include: a first transmitting unit configured to transmit first indication information to a terminal device, the first indication information indicating whether each candidate resource of the first-type SSB in the resource period carries the first-type SSB.

In some embodiments of the present disclosure, the first indication information may indicate whether each candidate resource of the first-type SSB in the resource period carries the SSB via a bit sequence, each bit in the bit sequence indicating whether the candidate resource corresponding to the bit among all the candidate resources carries the first-type SSB.

In some embodiments of the present disclosure, the second indication information may indicate whether each candidate resource of the first-type SSB in the resource period carries the first-type SSB by reusing at least one bit in an information field in a Physical Broadcast Channel (PBCH) or at least one bit in an information field in a System Information Block (MIB).

In some embodiments of the present disclosure, the information field in the PBCH may include at least one of:
  an information field carrying a System Frame Number (SFN);
  an information field carrying a subcarrier offset condition;
  an information field carrying a half-frame indication; and
  an information field carrying an index of the SSB.

In some embodiments of the present disclosure, the information field in the MIB may include at least one of:
  an information field carrying a System Frame Number (SFN);
  an information field carrying a subcarrier offset condition;
  an information field carrying configuration information of System Information SIB1;
  an information field carrying cell bar access information;
  an information field carrying intra-frequency reselection information; and
  an idle field.

In some embodiments of the present disclosure, the first indication information may indicate whether each candidate resource of the first-type SSB in the resource period carries the first-type SSB via Demodulation Reference Signals (DMRSs) of different Physical Broadcast Channels (PBCHs).

In some embodiments of the present disclosure, the control information of the RMSI may include the first indication information.

In some embodiments of the present disclosure, the network device may further include: a second transmitting unit configured to transmit second indication information to a terminal device, the second indication information indicating a number of first-type SSBs carried in the resource period.

In some embodiments of the present disclosure, the second indication information may indicate the number of first-type SSBs carried in the resource period by reusing at least one bit in an information field in a Physical Broadcast Channel (PBCH) or at least one bit in an information field in a System Information Block (MIB).

In some embodiments of the present disclosure, the information field in the PBCH may include at least one of:
  an information field carrying a System Frame Number (SFN);
  an information field carrying a subcarrier offset condition;
  an information field carrying a half-frame indication; and
  an information field carrying an index of the SSB.

In some embodiments of the present disclosure, the information field in the MIB may include at least one of:
  an information field carrying a System Frame Number (SFN);
  an information field carrying a subcarrier offset condition;
  an information field carrying configuration information of System Information SIB1;
  an information field carrying cell bar access information;
  an information field carrying intra-frequency reselection information; and
  an idle field.

In some embodiments of the present disclosure, the second indication information may indicate the number of first-type SSBs carried in the resource period via a Demodulation Reference Signal (DMRS) of a Physical Broadcast Channel (PBCH).

In some embodiments of the present disclosure, the control information of the RMSI may include the second indication information.

In some embodiments of the present disclosure, the first determining unit 510 may be further configured to: determine a resource period of the first-type SSB.

In some embodiments of the present disclosure, the resource period may be a predefined period or a configured period, or the resource period may be a maximum or minimum value of a plurality of configured periods, or the resource period may be a period between the maximum value and the minimum value of the plurality of configuration periods.

In some embodiments of the present disclosure, the network device may further include: a third transmitting unit configured to transmit third indication information to a terminal device, the third indication information indicating the resource period.

In some embodiments of the present disclosure, the third indication information may indicate the resource period by reusing at least one bit in an information field in a Physical Broadcast Channel (PBCH) or at least one bit in an information field in a System Information Block (MIB).

In some embodiments of the present disclosure, the information field in the PBCH may include at least one of:
  an information field carrying a System Frame Number (SFN);
  an information field carrying a subcarrier offset condition;
  an information field carrying a half-frame indication; and
  an information field carrying an index of the SSB.

In some embodiments of the present disclosure, the information field in the MIB may include at least one of:
  an information field carrying a System Frame Number (SFN);
  an information field carrying a subcarrier offset condition;
  an information field carrying configuration information of System Information SIB1;
  an information field carrying cell bar access information;
  an information field carrying intra-frequency reselection information; and
  an idle field.

In some embodiments of the present disclosure, the third indication information may indicate the resource period via a Demodulation Reference Signal (DMRS) of a Physical Broadcast Channel (PBCH).

In some embodiments of the present disclosure, the control information of the RMSI may include the third indication information.

In some embodiments of the present disclosure, the second determining unit 520 may be further configured to: determine a resource other than the unavailable resource in the first resource as an available resource for the RMSI; and transmit control information or data information of the RMSI to a terminal device on the available resource for the RMSI.

In some embodiments of the present disclosure, the first-type SSB may include an SSB carrying a Physical Cell Identity (PCI) and a System Information Block (MIB).

In some embodiments of the present disclosure, the network device may be applicable to a New Radio Unlicensed (NR-U) communication network.

It can be appreciated that the apparatus embodiments and the method embodiments may correspond to each other, and for similar descriptions, reference can be made to the method embodiments. In particular, the network device 500 shown in FIG. 12 may correspond to the corresponding entity that performs the method 300 according to the embodiment of the present disclosure. The above and other operations and/or functions of the respective units in the network device 500 implement the corresponding processes in the methods shown in FIG. 10, and details thereof will be omitted here for simplicity.

The communication device according to the embodiment of the present disclosure has been described above from the perspective of functional modules with reference to the figures. It can be appreciated that the functional modules can be implemented in the form of hardware, in the form of software instructions, or in any combination of hardware and software modules.

In particular, the steps of the above method embodiments of the present disclosure can be implemented by hardware integrated logic circuits in a processor or instructions in the form of software. The steps of the methods disclosed in the embodiments of the present disclosure may be directly embodied as being performed and completed by a hardware decoding processor, or by a combination of hardware and software modules in the decoding processor.

Optionally, the software modules can be located in a known storage medium in the related art, such as a random access memory, a flash memory, a read-only memory, a programmable read-only memory, an electrically erasable programmable memory, or a register. The storage medium can be located in the memory, and the processor can read information from the memory and perform the steps of the above method embodiments in combination with its hardware.

For example, the above processing unit and communication unit can be implemented by a processor and a transceiver, respectively.

FIG. 12 is a schematic diagram showing a structure of a communication device 600 according to an embodiment of the present disclosure.

Referring to FIG. 12, the communication device 600 can include a processor 610.

The processor 610 can invoke and execute a computer program from a memory to perform the method according to any of the embodiments of the present disclosure.

Referring to FIG. 12 again, the communication device 600 may further include a memory 620.

The memory 620 may be configured to store indication information and codes and instructions executable by the processor 610. Here, the processor 610 can invoke and execute a computer program from the memory 620 to perform the method according to any of the embodiments of the present disclosure. The memory 620 may be a separate device independent from the processor 610, or may be integrated in the processor 610.

Referring to FIG. 12 again, the communication device 600 may further include a transceiver 630.

The processor 610 can control the transceiver 630 to communicate with other devices, and in particular to transmit information or data to other devices or receive information or data transmitted by other devices. The transceiver 630 may include a transmitter and a receiver. The transceiver 630 may further include one or more antennas.

It can be appreciated that the various components in the communication device 600 can be connected by a bus system. In addition to a data bus, the bus system may further include a power bus, a control bus, and a status signal bus.

It can also be appreciated that the communication device 600 may be the terminal device in the embodiment of the present disclosure, and the communication device 600 can perform corresponding procedures implemented by the terminal device in the method according to any of the embodiments of the present disclosure. In other words, the communication device 600 according to the embodiment of the present disclosure may correspond to the terminal device 400 according to the embodiment of the present disclosure and to the corresponding entity that performs the method 200 according to the embodiment of the present disclosure. Details thereof will be omitted here for simplicity. Similarly, the communication device 600 may be the network device in the embodiment of the present disclosure, and the communication device 600 can perform corresponding procedures implemented by the network device in the method according to any of the embodiments of the present disclosure. In other words, the communication device 600 according to the embodiment of the present disclosure may correspond to the network device 500 according to the embodiment of the present disclosure and to the corresponding entity that performs the method 300 according to the embodiment of the present disclosure. Details thereof will be omitted here for simplicity.

In addition, an embodiment of the present disclosure also provides a chip.

For example, the chip may be an integrated circuit chip, which has signal processing capabilities and can implement or execute the methods, steps, and logic block diagrams disclosed in the embodiments of the present disclosure. The chip may also be referred to as a system-level chip, a system chip, a chip system, or a system-on-chip, etc. Optionally, the chip can be applied in various communication devices, such that the communication device equipped with the chip can execute the methods, steps, and logical block diagrams disclosed in the embodiments of the present disclosure.

Figure 13:
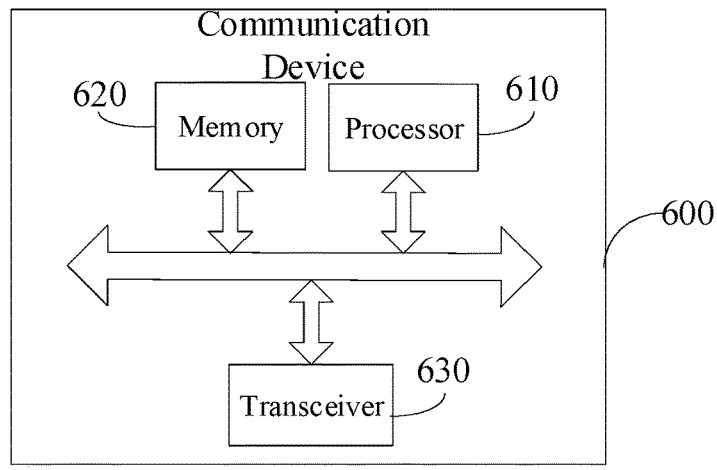
FIG. 13 is a schematic block diagram of a communication device according to an embodiment of the present disclosure.
Figure 14:
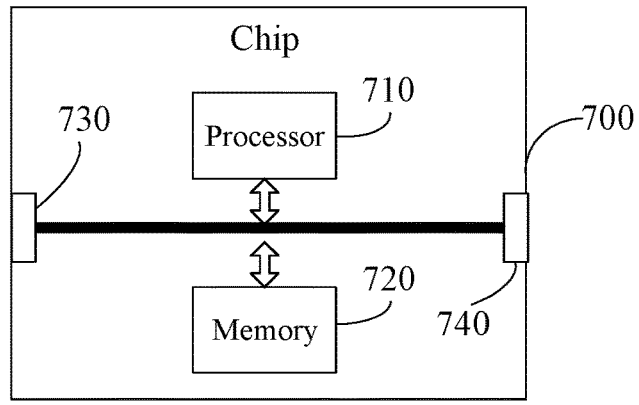
FIG. 14 is a schematic block diagram of a chip according to an embodiment of the present disclosure.

FIG. 13 is a schematic diagram showing a structure of a chip 700 according to an embodiment of the present disclosure.

Referring to FIG. 13, the chip 700 includes a processor 710.

The processor 710 can invoke and execute a computer program from a memory to implement the method in the embodiment of the present disclosure.

Referring to FIG. 13 again, the chip 700 may further include a memory 720.

The processor 10 can invoke and execute a computer program from the memory 720 to implement the method in the embodiment of the present disclosure. The memory 720 may be configured to store indication information and codes and instructions executable by the processor 710. The memory 720 may be a separate device independent from the processor 710, or may be integrated in the processor 710.

Referring to FIG. 13 again, the chip 700 may further include an input interface 730.

The processor 710 can control the input interface 730 to communicate with other devices or chips, and in particular, obtain information or data transmitted by other devices or chips.

Referring to FIG. 13 again, the chip 700 may further include an output interface 740.

The processor 710 can control the output interface 740 to communicate with other devices or chips, and in particular, output information or data to other devices or chips.

It can be appreciated that, the chip 700 can be applied to the network device in the embodiment of the present disclosure, and the chip can implement the corresponding processes implemented by the network device in the various methods of the embodiments of the present disclosure or the corresponding processes implemented by the terminal device in the various methods of the embodiments of the present disclosure. Details thereof will be omitted here for simplicity.

It can also be appreciated that the various components in the chip 700 can be connected by a bus system. In addition to a data bus, the bus system may further include a power bus, a control bus, and a status signal bus.

The processor may include, but not limited to, a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component, etc.

The processor can be configured to implement or perform the methods, steps, and logical block diagrams disclosed in the embodiments of the present disclosure. The steps of the methods disclosed in the embodiments of the present disclosure may be directly embodied as being performed and completed by a hardware decoding processor, or by a combination of hardware in the decoding processor and software modules. The software modules can be located in a known storage medium in the related art, such as random access memory, flash memory, read-only memory, programmable read-only memory, erasable programmable memory, or register. The storage medium can be located in the memory, and the processor can read information from the memory and perform the steps of the above methods in combination with its hardware.

The memory may include, but not limited to, a transitory memory and/or a non-transitory memory. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative rather than limiting examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM).

It is to be noted that the memory described in the present disclosure is intended to include, but not limited to, these and any other suitable types of memories.

An embodiment of the present disclosure also provides a computer-readable storage medium for storing a computer program. The computer-readable storage medium stores one or more programs, and the one or more programs include instructions which, when executed by a portable electronic device including a plurality of application programs, cause the portable electronic device to perform the method in the embodiment shown in the method 200 or 300.

Optionally, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including a computer program.

Optionally, the computer program product can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program which, when executed by a computer, causes the computer to perform the method in the embodiment shown in the method 200 or 300.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

In addition, an embodiment of the present disclosure also provides a communication system, which may include the above terminal device and network device to form the communication system 100 as shown in FIG. 1. Details thereof will be omitted here for simplicity. It should be noted that the term "system" as used herein may also be referred to as "network management architecture" or "network system".

It can also be appreciated that the terms used in the embodiments of the present disclosure and the claims as attached are only for the purpose of describing specific embodiments, and are not intended to limit the embodiments of the present disclosure.

For example, the singular forms of "a", "said", "above", and "the" as used in the embodiments of the present disclosure and the claims as attached are also intended to cover plural forms, unless indicated otherwise in the context.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of the embodiments of the present disclosure.

When the present disclosure is implemented in the form of a software functional unit and sold or used as a standalone product, it can be stored in a computer-readable storage medium. Based on this understanding, all or part of the technical solutions according to the embodiments of the present disclosure, or the part thereof that contributes to the prior art, can in nature be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways.

For example, in the device embodiments described above, the divisions of the units, modules or components are only divisions based on logical functions, and there may be other divisions in actual implementations. For example, more than one unit, module or component may be combined or integrated into another system, or some units, modules or components can be ignored or may not be executed.

As another example, the units/modules/components described as separate/displayed components may or may not be physically separated, that is, they may be co-located or distributed across a number of network elements. Some or all of the units/modules/components may be selected according to actual needs to achieve the objects of the embodiments of the present disclosure.

Finally, it is to be noted that the coupling or direct coupling or communicative connection as shown or discussed above may be indirect coupling or communicative connection between devices or units via some interfaces which may be electrical, mechanical, or in any other forms.

While the specific embodiments of the present disclosure have been described above, the protection scope of the embodiments of the present disclosure is not limited to these embodiments. Various variants or alternatives can be conceived by those skilled in the art without departing from the technical scope of the embodiments of the present disclosure. These variants and alternatives are to be encompassed by the protection scope of the embodiments of the present disclosure as defined by the claims as attached.

What is claimed is:

1. A method for determining an unavailable resource, comprising:
   determining, by a terminal device, a first resource corresponding to a first-type Synchronization Signal Block (SSB); and
   determining, by the terminal device, an unavailable resource for Remaining System Information (RMSI) based on the first resource and a second resource corresponding to the RMSI,
   wherein the first-type SSB is an SSB transmitted on a non-Synchronization Signal (SS) raster,
   wherein the second resource is a resource in a control resource set that is to be used for transmitting control information of the RMSI, and the unavailable resource is a resource unavailable for the control information,
   wherein said determining, by the terminal device, the unavailable resource for the RMSI based on the first resource and the second resource corresponding to the RMSI comprises:
   determining, by the terminal device from the second resource, a target candidate Physical Downlink Control Channel (PDCCH) that overlaps the first resource as the resource unavailable for the control information.

2. The method according to claim 1, wherein said determining, by the terminal device, the unavailable resource for the RMSI based on the first resource and the second resource corresponding to the RMSI comprises:
 determining, by the terminal device, a symbol where an overlapping area between the first resource and the second resource is located as the resource unavailable for the control information.

3. The method according to claim 2, wherein said determining, by the terminal device, the symbol where the overlapping area between the first resource and the second resource is located as the resource unavailable for the control information comprises:
 determining, by the terminal device when the first resource and the second resource are not Quasi-Co-Located (QCLed), the symbol where the overlapping area between the first resource and the second resource is located as the resource unavailable for the control information.

4. The method according to claim 1, wherein said determining, by the terminal device from the second resource, the target candidate PDCCH that overlaps the first resource as the resource unavailable for the control information comprises:
 determining, by the terminal device, the target candidate PDCCH as the resource unavailable for the control information when the first resource and the second resource are Quasi-Co-Located (QCLed).

5. The method according to claim 1, wherein the target candidate PDCCH comprises a candidate PDCCH that overlaps the first resource by at least one Control Channel Element (CCE) or at least one Resource Element (RE).

6. The method according to claim 1, wherein said determining, by the terminal device, the unavailable resource for the RMSI based on the first resource and the second resource corresponding to the RMSI comprises:
 determining, by the terminal device, that the first-type SSB is not carried in the second resource.

7. The method according to claim 1, wherein the second resource is a resource for transmitting data information of the RMSI, and the unavailable resource is a resource unavailable for the data information.

8. The method according to claim 7, wherein said determining, by the terminal device, the unavailable resource for the RMSI based on the first resource and the second resource corresponding to the RMSI comprises:
 determining, by the terminal device, a symbol where an overlapping area between the first resource and the second resource is located as the resource unavailable for the data information.

9. The method according to claim 8, wherein said determining, by the terminal device, the symbol where the overlapping area between the first resource and the second resource is located as the resource unavailable for the data information comprises:
 determining, by the terminal device when the first resource and the second resource are not Quasi-Co-Located (QCLed), the symbol where the overlapping area between the first resource and the second resource is located as the resource unavailable for the data information.

10. The method according to claim 7, wherein said determining, by the terminal device, the unavailable resource for the RMSI based on the first resource and the second resource corresponding to the RMSI comprises:
 determining, by the terminal device, a resource in the second resource that overlaps the first resource as the resource unavailable for the data information.

11. The method according to claim 10, wherein said determining, by the terminal device, the resource in the second resource that overlaps the first resource as the resource unavailable for the data information comprises:
 determining, by the terminal device, the resource in the second resource that overlaps the first resource as the resource unavailable for the data information when the first resource and the second resource are Quasi-Co-Located (QCLed).

12. A terminal device, comprising a processor, a memory, and a transceiver, wherein the memory is configured to store a computer program, and the processor is configured to invoke and execute the computer program stored in the memory to:
 determine a first resource corresponding to a first-type Synchronization Signal Block (SSB); and
 determine an unavailable resource for Remaining System Information (RMSI) based on the first resource and a second resource corresponding to the RMSI,
 wherein the first-type SSB is an SSB transmitted on a non-Synchronization Signal (SS) raster
 wherein the second resource is a resource in a control resource set that is to be used for transmitting control information of the RMSI, and the unavailable resource is a resource unavailable for the control information,
 wherein the processor is further configured to invoke and execute the computer program stored in the memory to:
 determine, from the second resource, a target candidate Physical Downlink Control Channel PDCCH) that overlaps the first resource as the resource unavailable for the control information.

13. The terminal device according to claim 12, wherein the processor is further configured to invoke and execute the computer program stored in the memory to:
 determine a symbol where an overlapping area between the first resource and the second resource is located as the resource unavailable for the control information.

14. The terminal device according to claim 13, wherein the processor is further configured to invoke and execute the computer program stored in the memory to:
 determine, when the first resource and the second resource are not Quasi-Co-Located (QCLed), the symbol where the overlapping area between the first resource and the second resource is located as the resource unavailable for the control information.

15. The terminal device according to claim 12, wherein the processor is further configured to invoke and execute the computer program stored in the memory to:
 determine the target candidate PDCCH as the resource unavailable for the control information when the first resource and the second resource are Quasi-Co-Located (QCLed).

16. The terminal device according to claim 12, wherein the target candidate PDCCH comprises a candidate PDCCH that overlaps the first resource by at least one Control Channel Element (CCE) or at least one Resource Element (RE).

* * * * *